US012565108B2

(12) United States Patent
Yoshimi et al.

(10) Patent No.: US 12,565,108 B2
(45) Date of Patent: Mar. 3, 2026

(54) ELECTRIFIED VEHICLE

(71) Applicant: TOYOTA JIDOSHA KABUSHIKI KAISHA, Toyota (JP)

(72) Inventors: Masashi Yoshimi, Toyota (JP); Makoto Tawara, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 18/638,956

(22) Filed: Apr. 18, 2024

(65) Prior Publication Data

US 2025/0074205 A1 Mar. 6, 2025

(30) Foreign Application Priority Data

Aug. 29, 2023 (JP) ................................. 2023-138851

(51) Int. Cl.
B60L 15/20 (2006.01)
B60L 15/34 (2006.01)

(52) U.S. Cl.
CPC ............... B60L 15/20 (2013.01); B60L 15/34 (2013.01); B60L 2260/26 (2013.01)

(58) Field of Classification Search
CPC .................................. B60L 15/20; B60L 15/34
See application file for complete search history.

(56) References Cited

U.S. PATENT DOCUMENTS

| | | | | |
|---|---|---|---|---|
| 2013/0261858 A1* | 10/2013 | Higashitani | ............. | B60L 15/20 701/22 |
| 2017/0334454 A1* | 11/2017 | Abe | .................. | B60W 50/0098 |
| 2020/0156442 A1* | 5/2020 | Cosgrove | .............. | H01M 10/63 |
| 2024/0123863 A1* | 4/2024 | Chon | ...................... | B60L 15/20 |

FOREIGN PATENT DOCUMENTS

| | | |
|---|---|---|
| JP | 2018-127134 A | 8/2018 |

* cited by examiner

*Primary Examiner* — Tan Q Nguyen
(74) *Attorney, Agent, or Firm* — Oliff PLC

(57) ABSTRACT

An electrified vehicle includes: a mode switch that gives an instruction of switching being performed in order of a first mode, a third mode and a second mode, among the first mode, the second mode and the third mode; and a control device that sets a traveling mode to one of the modes in accordance with the mode switch operation and controls a motor and an auxiliary machine in accordance with the traveling mode. When the mode switch has been operated while the traveling mode is the first mode, the control device switches the traveling mode from the first mode to the second mode without the switching to the third mode, if the mode switch has been operated again within a predetermined time, and switches the traveling mode from the first mode to the third mode, if the mode switch has not been operated again within the predetermined time.

5 Claims, 1 Drawing Sheet

ELECTRIFIED VEHICLE

CROSS-REFERENCE TO RELATED APPLICATION

This application claims priority to Japanese Patent Application No. 2023-138851 filed on Aug. 29, 2023, incorporated herein by reference in its entirety.

BACKGROUND

1. Technical Field

The present disclosure relates to an electrified vehicle.

2. Description of Related Art

Conventionally, there has been proposed a hybrid electric vehicle including: an engine; a motor; an automatic transmission that shifts the dynamic power from the engine or the motor and that transmits the dynamic power to drive wheels; a shift-mode switching unit that switches a shift mode; and a traveling-mode switching unit that performs switching between a motor traveling mode for a traveling using only the dynamic power of the motor and an engine using mode for a traveling using at least the dynamic power of the engine, depending on at least the shift mode (see Japanese Unexamined Patent Application Publication No. 2018-127134, for example). In this hybrid electric vehicle, when the shift mode has been switched, the traveling-mode switching unit prohibits the switching of the traveling mode for a prescribed time period.

SUMMARY

An electrified vehicle including a motor for traveling sometimes includes a mode switch that gives an instruction of switching among a first mode, a second mode and a third mode whenever the mode switch is operated by a driver. The third mode is a mode in which the electric power consumption of the vehicle is restricted compared to the first and second modes. The switching is performed in the order of the first mode, the third mode and the second mode. In this case, when the mode switch has been operated by the driver twice consecutively in a state where the traveling mode is the first mode, the traveling mode is switched from the first mode to the third mode, and thereafter the traveling mode is switched from the third mode to the second mode. As a result, after the electric power consumption of the vehicle is restricted compared to the first and second modes, the restriction is cancelled in a relatively short time period. For example, an auxiliary machine such as an air-conditioning device is stopped, and then is actuated again in a relatively short time period. Therefore, the driver can have a feeling of strangeness An electrified vehicle in the present disclosure has a main object to restrain the driver from having a feeling of strangeness.

The electrified vehicle in the present disclosure adopts the following means for achieving the above-described main object.

The electrified vehicle in the present disclosure is an electrified vehicle including a motor for traveling, an inverter that drives the motor, an electric storage device that is connected to the inverter through an electric power line, and an auxiliary machine that is connected to the electric power line, the electrified vehicle including:

a mode switch that gives an instruction of switching among a first mode, a second mode and a third mode whenever the mode switch is operated by a driver, the third mode being a mode in which electric power consumption of the electrified vehicle is restricted compared to the first mode and the second mode, the switching being performed in order of the first mode, the third mode and the second mode; and a control device that sets a traveling mode to one of the first mode, the second mode and the third mode in accordance with operation of the mode switch and that controls the motor and the auxiliary machine in accordance with the traveling mode, in which when the mode switch has been operated in a state where the traveling mode is the first mode, the control device switches the traveling mode from the first mode to the second mode without the switching to the third mode, in a case where the mode switch has been operated again within a predetermined time period, and switches the traveling mode from the first mode to the third mode, in a case where the mode switch has not been operated again within the predetermined time period.

In the electrified vehicle in the present disclosure, when the mode switch has been operated in the state where the traveling mode is the first mode, the traveling mode is switched from the first mode to the second mode without the switching to the third mode, in the case where the mode switch has been operation again within the predetermined time period, and the traveling mode is switched from the first mode to the third mode, in the case where the mode switch has not been operated again within the predetermined time period. Thereby, it is possible to avoid the traveling mode from being switched from the third mode to the second mode in a relatively short time period after the traveling mode is switched from the first mode to the third mode. As a result, it is possible to avoid the restriction of the electric power consumption of the vehicle compared to the first and second modes from being cancelled in a relatively short time period after the electric power consumption of the vehicle is restricted, for example, to avoid an auxiliary machine such as an air-conditioning device from being actuated again in a relatively short time period after the auxiliary machine is stopped, and it is possible to restrain the driver from having a feeling of strangeness.

In the electrified vehicle in the present disclosure, the auxiliary machine may be an air-conditioning device that performs air conditioning in a vehicle cabin, and the third mode may be a mode in which the electric power consumption of the electrified vehicle is restricted compared to the first mode and the second mode, by execution of at least one of traveling drive power restriction, vehicle velocity restriction, and stop of the air-conditioning device.

In the electrified vehicle in the present disclosure, the first mode may be one mode of a normal mode, a sport mode and an ecology mode, the sport mode being a mode in which priority is given to output responsiveness of traveling drive power compared to the normal mode, the ecology mode being a mode in which priority is given to electric efficiency compared to the normal mode and the sport mode, and the second mode may be one mode that is of the normal mode, the sport mode and the ecology mode and that is different from the first mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figures 1, 2:
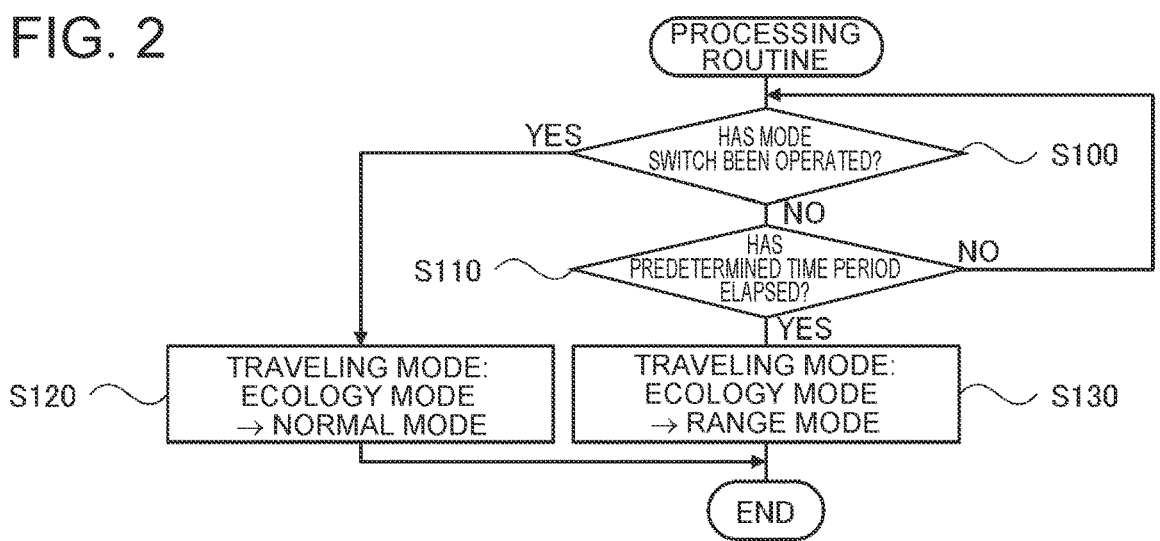
FIG. 1 is a schematic configuration diagram of a battery electric vehicle 20 in an embodiment of the present disclosure.
FIG. 2 is a flowchart showing an exemplary processing routine that is executed by an electronic control unit 50.

An embodiment of the present disclosure will be described with reference to the drawing. FIG. 1 is a schematic configuration diagram of a battery electric vehicle 20 in the embodiment of the present disclosure. As shown in the figure, the battery electric vehicle 20 in the embodiment includes a motor 32, an inverter 34, a high-voltage battery 36 as an electric storage device, an air-conditioning device 40, a low-voltage battery 42, a DC-DC converter 46, and an electronic control unit (referred to as an "ECU", hereinafter) 50.

The motor 32 is configured as a three-phase alternating-current motor, and includes a rotor in which a permanent magnet is buried in a rotor core, and a stator in which a three-phase coil is wound around a stator core. The rotor of the motor 32 is connected to a drive shaft 26 that is coupled to drive wheels 22a, 22b through a differential gear 24.

The inverter 34 is used for the drive of the motor 32, and is connected to a high-voltage power line 38. When direct-current voltage is applied to the inverter 34, the switching of a plurality of switching elements of the inverter 34 is controlled by the electronic control unit 50. Thereby, a rotating magnetic field is formed in the three-phase coil of the motor 32, and the motor 32 is driven and rotated.

The high-voltage battery 36 is configured as a lithium-ion secondary battery or nickel-hydrogen secondary battery in which the rated voltage is about several hundred volts, for example, and is connected to the high-voltage power line 38. The air-conditioning device 40 is connected to the high-voltage power line 38, and performs the conditioning of the air in an occupant compartment.

The low-voltage battery 42 is configured as a lithium-ion secondary battery or lead storage battery in which the rated voltage is about 12 V to 14 V, for example, and is connected to a low-voltage power line 44. The DC-DC converter 46 is connected to the high-voltage power line 38 and the low-voltage power line 44, and steps down the electric power of the high-voltage power line 38, to supply the electric power to the low-voltage power line 44.

The electronic control unit 50 includes a microcomputer, and the microcomputer includes a CPU, a ROM, a RAM, a flash memory, input and output ports, and a communication port. Signals from various sensors are input to the electronic control unit 50 through input ports. As the signal that is input to the electronic control unit 50, for example, there can be a rotational position Om from a rotational position sensor (for example, a resolver) 32a that detects the rotational position of the rotor of the motor 32, and phase currents Iv, Iw from current sensors that detect electric currents in the V-phase and W-phase of the motor 32. In addition, there can be a voltage Vbh from a voltage sensor that is attached between terminals of the high-voltage battery 36, an electric current Ibh from a current sensor that is attached to an output terminal of the high-voltage battery 36, and a voltage Vb1 from a voltage sensor that is attached between terminals of the low-voltage battery 42. Furthermore, there can be a start signal from a start switch 60, a shift position SP from a shift sensor 62 that detects the operation position of a shift lever 61, an accelerator opening amount Acc from an accelerator sensor 64 that detects the stepping amount of an accelerator pedal 63, a brake pedal position from a brake sensor 66 that detects the stepping amount of a brake pedal 65, and a vehicle velocity V from a vehicle velocity sensor 67. There can be an on-signal and off-signal from an air-conditioning switch 68, and an operation signal from a mode switch 69. The air-conditioning switch 68 is a switch that gives an instruction of the actuation or stop of the air-conditioning device 40 by being turned on or off. The mode switch 69 is a switch that gives an instruction of the switching of the traveling mode in a toggling manner in the order of a normal mode, a sport mode, an ecology mode, a range mode and the normal mode, whenever the mode switch 69 is operated by a driver. The sport mode is a mode in which priority is given to the output responsiveness of traveling drive power compared to the normal mode, the ecology mode and the range mode. The ecology mode is a mode in which priority is given to electric efficiency compared to the normal mode and the sport mode. The range mode is a mode in which the electric power consumption of the vehicle is restricted for increasing the cruising distance of the vehicle, compared to the normal mode, the sport mode and the ecology mode. In the embodiment, as described later, the air-conditioning device 40 is forcibly stopped.

Various control signals are output from the electronic control unit 50 through output ports. As the signal that is output from the electronic control unit 50, for example, there can be a control signal to the inverter 34, a control signal to the air-conditioning device 40, and a control signal to the DC-DC converter 46. The electronic control unit 50 computes an electric storage level SOC of the high-voltage battery 36, based on the electric current Ibh of the high-voltage battery 36 that is output from the current sensor.

In the battery electric vehicle 20 in the embodiment, the electronic control unit 50 sets a required torque Td* that is required for traveling (that is required for the drive shaft 26), based on the traveling mode, the accelerator operation amount Acc and the vehicle velocity V, sets a torque command Tm* of the motor 32 such that the required torque Td* is output to the drive shaft 26, and controls the switching of the plurality of switching elements of the inverter 34 such that the motor 32 is driven at the torque command Tm*. A method for setting the traveling mode will be described later. For example, the required torque Td* can be set by deriving the required torque Td* while applying the traveling mode, the accelerator operation amount Acc and the vehicle velocity V to a required torque map that is previously specified as a relation among the traveling mode, the accelerator operation amount Acc, the vehicle velocity V and the required torque Td*. In the required torque map, with respect to an identical accelerator operation amount Acc (0%<Acc<100%), the required torque Td* increases in the order of the range mode, the ecology mode, the normal mode and the sport mode.

In the battery electric vehicle 20 in the embodiment, when the traveling mode is the normal mode, the ecology mode or the sport mode, the electronic control unit 50 actuates or stops the air-conditioning device 40 depending on whether the air-conditioning switch 68 is in the on-state or in the off-state. When the traveling mode is the range mode, the air-conditioning device 40 is stopped regardless of whether the air-conditioning switch 68 is in the on-state or in the off-state.

Furthermore, in the battery electric vehicle 20 in the embodiment, the electronic control unit 50 sets (switches) the traveling mode based on the operation signal from the mode switch 69. Specifically, when the mode switch 69 has been operated in a state where the traveling mode is the normal mode, the traveling mode is immediately switched to the sport mode. When the mode switch 69 has been operated in a state where the traveling mode is the sport mode, the traveling mode is immediately switched to the ecology mode. When the mode switch 69 has been operated in a state where the traveling mode is the range mode, the traveling mode is immediately switched to the normal mode. When the mode switch 69 has been operated in a state where the traveling mode is the ecology mode, a processing routine in FIG. 2 is executed.

In the routine, the electronic control unit 50 determines whether the mode switch 69 has been operated (step S100), and when it is determined that the mode switch 69 has not been operated, the electronic control unit 50 determines whether a predetermined time period has elapsed since the operation of the mode switch 69 in the state where the traveling mode is the ecology mode (since the start of the execution of the routine) (step S110). The predetermined time period is a time period that is used for determining whether the driver has the intention to switch the traveling mode from the ecology mode to the normal mode, and is about several seconds, for example. The determination process in step S110 is executed assuming that the mode switch 69 is operated by the driver twice consecutively in the case where the driver has the intention to switch the traveling mode from the ecology mode to the normal mode. When it is determined in step S110 that the predetermined time period has not elapsed since the operation of the mode switch 69 in the state where the traveling mode is the ecology mode, the routine returns to step S100.

When it is determined in step S100 that the mode switch 69 has been operated, it is determined that the mode switch 69 has been operated again within the predetermined time period after the operation of the mode switch 69 in the state where the traveling mode is the ecology mode. In this case, the traveling mode is switched from the ecology mode to the normal mode without the switching to the range mode (step S120), and the routine ends.

Suppose a predetermined time when the mode switch 69 has been operated by the driver twice consecutively in a state where the air-conditioning device 40 has been actuated and the traveling mode is the ecology mode. In the case of a comparative form in which the traveling mode is immediately switched to the range mode when the mode switch 69 has been operated in the state where the traveling mode is the ecology mode, the traveling mode, at the predetermined time, is switched from the ecology mode to the range mode, and thereafter, the traveling mode is switched from the range mode to the normal mode. Therefore, the air-conditioning device 40 is stopped due to the switching of the traveling mode to the range mode, and thereafter, the air-conditioning device 40 is actuated again in a relatively short time period due to the switching of the traveling mode to the normal mode. It is assumed that the driver has the intention to switch the traveling mode from the ecology mode to the normal mode, and therefore, when the air-conditioning device 40 is stopped and is actuated again in a relatively short time period, the driver can have a feeling of strangeness. In contrast, in the embodiment, at the predetermined time, the traveling mode is switched from the ecology mode to the normal mode without the switching to the range mode. Thereby, the air-conditioning device 40 continuously operates without stopping. As a result, it is possible to restrain the driver from having a feeling of strangeness.

When it is determined in step S110 that the predetermined time period has elapsed since the operation of the mode switch 69 in the state where the traveling mode is the ecology mode, it is determined that the mode switch 69 has not been operated again within the predetermined time period after the operation of the mode switch 69 in the state where the traveling mode is the ecology mode. Then, the traveling mode is switched from the ecology mode to the range mode (step S130), and the routine ends.

In the above-described battery electric vehicle 20 in the embodiment, when the mode switch 69 has been operated again within the predetermined time period after the operation of the mode switch 69 in the state where the traveling mode is the ecology mode, the traveling mode is switched from the ecology mode to the normal mode without the switching to the range mode. Thereby, it is possible to avoid the traveling mode from being switched from the range mode to the normal mode in a relatively short time period after the traveling mode is switched from the ecology mode to the range mode. As a result, it is possible to avoid the air-conditioning device 40 from being actuated again in a relatively short time period after the stop of the air-conditioning device 40, and to restrain the driver from having a feeling of strangeness.

In the above-described embodiment, when the traveling mode is the range mode, the electric power consumption of the vehicle is restricted compared to the normal mode, the sport mode and the ecology mode, by the stop of the air-conditioning device 40. However, when the traveling mode is the range mode, the electric power consumption of the vehicle may be restricted compared to the normal mode, the sport mode and the ecology mode, by performing the operating restriction of the DC-DC converter 46, traveling drive power restriction (for example, the restriction of the above-described required torque Td*), or vehicle velocity restriction, in addition to or instead of the stop of the air-conditioning device 40.

In the above-described embodiment, the mode switch 69 gives the instruction of the switching of the traveling mode in a toggling manner in the order of the normal mode, the sport mode, the ecology mode, the range mode and the normal mode. However, without being limited to this, the mode switch 69 only needs to give the instruction of the switching in a toggling manner in the order of a first mode and a second mode. The first mode is one mode of the normal mode, the sport mode and the ecology mode. The second mode is one mode that is of the range mode, the normal mode, the sport mode and the ecology mode and that is different from the first mode.

In the above-described embodiment, as the traveling mode, there are the normal mode, the sport mode, the ecology mode and the range mode. However, without being limited to this, as the traveling mode, there only need to be at least two modes of the normal mode, the sport mode and the ecology mode, and the range mode in which the electric power consumption of the vehicle is restricted compared to the normal mode, the sport mode and the ecology mode.

In the above-described embodiment, the battery electric vehicle 20 includes the high-voltage battery 36 as the electric storage device, but may include a capacitor as the electric storage device, instead of or in addition to the high-voltage battery 36.

In the above-described embodiment, the battery electric vehicle 20 that includes the motor 32 for traveling, the inverter 34 and the high-voltage battery 36 has been described. However, a hybrid electric vehicle that further includes an engine in addition to the motor, the inverter and the high-voltage battery may be adopted, or a fuel cell electric vehicle that further includes a fuel cell in addition to the motor, the inverter and the high-voltage battery may be adopted.

The correspondence relation between major elements of the embodiment and major elements of the disclosure described in SUMMARY will be described. In the embodiment, the motor 32 corresponds to the "motor", the inverter 34 corresponds to the "inverter", the high-voltage battery 36 corresponds to the "electric storage device", the air-conditioning device 40 corresponds to the "auxiliary machine", the mode switch 69 corresponds to the "mode switch", and the electronic control unit 50 corresponds to the "control device".

The correspondence relation between major elements in the embodiment and major elements of the disclosure described in SUMMARY does not limit elements of the disclosure described in SUMMARY, because the embodiment is an example for specifically describing a mode for carrying out the disclosure described in SUMMARY. That is, the disclosure described in SUMMARY should be interpreted based on the description in SUMMARY, and the embodiment is just a specific example of the disclosure described in SUMMARY.

The embodiment for carrying out the present disclosure has been described above. The present disclosure is not limited to the embodiment at all, and naturally, can be carried out as various modes without departing from the spirit of the present disclosure.

The present disclosure can be utilized in the electrified vehicle manufacturing industry and the like.

What is claimed is:

1. An electrified vehicle including a motor for traveling, an inverter that drives the motor, an electric storage device that is connected to the inverter through an electric power line, and an auxiliary machine that is connected to the electric power line, the electrified vehicle comprising:

a mode switch that gives an instruction of switching among a first mode, a second mode and a third mode whenever the mode switch is operated by a driver, the third mode being a mode in which electric power consumption of the electrified vehicle is restricted compared to the first mode and the second mode, the switching being performed in order of the first mode, the third mode and the second mode; and a control device that sets a traveling mode to one of the first mode, the second mode and the third mode in accordance with operation of the mode switch and that controls the motor and the auxiliary machine in accordance with the traveling mode, wherein when the mode switch has been operated in a state where the traveling mode is the first mode, the control device switches the traveling mode from the first mode to the second mode without the switching to the third mode, in a case where the mode switch has been operated again within a predetermined time period, and switches the traveling mode from the first mode directly to the third mode, in a case where the mode switch has not been operated again within the predetermined time period.

2. The electrified vehicle according to claim 1, wherein:

the auxiliary machine is an air-conditioning device that performs air conditioning in a vehicle cabin; and the third mode is a mode in which the electric power consumption of the electrified vehicle is restricted compared to the first mode and the second mode, by execution of at least one of traveling drive power restriction, vehicle velocity restriction, and stop of the air-conditioning device.

3. The electrified vehicle according to claim 1, wherein:

the first mode is one mode of a normal mode, a sport mode and an ecology mode, the sport mode being a mode in which priority is given to output responsiveness of traveling drive power compared to the normal mode, the ecology mode being a mode in which priority is given to electric efficiency compared to the normal mode and the sport mode; and the second mode is one mode that is of the normal mode, the sport mode and the ecology mode and that is different from the first mode.

4. The electrified vehicle according to claim 1, wherein the predetermined time period starts when the mode switch is operated while the traveling mode is the first mode.

5. The electrified vehicle according to claim 1, wherein:

the auxiliary machine includes an air-conditioning device that performs air conditioning in a vehicle cabin, the control device controls the air-conditioning device at a first setting when the traveling mode is the first mode or the second mode, and the control device controls the air-conditioning device at a second setting different from the first setting when the traveling mode is the third mode.

* * * * *